United States Patent
Marinier et al.

(10) Patent No.: US 8,630,265 B2
(45) Date of Patent: *Jan. 14, 2014

(54) METHOD AND APPARATUS FOR ACCOMMODATING HIGHER ORDER MODULATION IN WIRELESS COMMUNICATION

(75) Inventors: Paul Marinier, Brossard (CA); Benoit Pelletier, Roxboro (CA); Diana Pani, Montreal (CA)

(73) Assignee: Interdigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/449,548

(22) Filed: Apr. 18, 2012

(65) Prior Publication Data

US 2012/0287970 A1 Nov. 15, 2012

Related U.S. Application Data

(63) Continuation of application No. 12/191,115, filed on Aug. 13, 2008, now Pat. No. 8,233,451.

(60) Provisional application No. 60/955,527, filed on Aug. 13, 2007.

(51) Int. Cl.
*H04W 36/00* (2009.01)

(52) U.S. Cl.
USPC ........ 370/331; 370/204; 370/252; 370/310.2; 370/328; 370/349; 455/17; 455/23; 455/42; 455/102; 455/205; 455/422.1; 455/432.1; 455/436

(58) Field of Classification Search
USPC .............. 370/204, 252, 310.2, 328–339, 349; 455/17, 23, 42, 44, 102, 205, 422.1, 455/432.1, 436–444
See application file for complete search history.

(56) References Cited

U.S. PATENT DOCUMENTS

| 8,233,451 B2 | 7/2012 | Marinier et al. |
| 2003/0147371 A1 | 8/2003 | Choi et al. |

(Continued)

FOREIGN PATENT DOCUMENTS

| EP | 1583272 A1 | 10/2005 |
| WO | WO 00/28760 A2 | 10/2000 |

(Continued)

OTHER PUBLICATIONS

3rd Generation Partnership Project (3GPP), R1-03-0284, "Scheduled and Autonomous Mode Operation for the Enhanced Uplink", Lucent, 3GPP TSG RAN WG1#31, Tokyo, Japan, Feb. 17-20, 2003, 7 pages.

(Continued)

*Primary Examiner* — Hoon J Chung
(74) *Attorney, Agent, or Firm* — Condo Roccia LLP

(57) ABSTRACT

A method and apparatus for reconfiguring a wireless transmit/receive unit (WTRU) are directed to receiving an active set update message indicating that a mode of operation allowing a certain modulation scheme is enabled or disabled and performing at least one of: performing a MAC reset procedure, updating a set of reference enhanced transport format combination indicators (E-TFCIs) and associated power offsets, determining actions related to E-DPCCH boosting, modifying information related to an enhanced dedicated channel (E-DCH), and modifying an index that indicates an E-DCH transport block size table. The update message includes at least one modified information element (IE).

24 Claims, 4 Drawing Sheets

(56) References Cited

U.S. PATENT DOCUMENTS

| | | |
|---|---|---|
| 2003/0148781 A1 | 8/2003 | Sommer |
| 2006/0067279 A1 | 3/2006 | Kim et al. |
| 2007/0230516 A1 | 10/2007 | Torsner et al. |
| 2008/0080424 A1 | 4/2008 | Torsner et al. |
| 2008/0225766 A1* | 9/2008 | Roy et al. ............... 370/310 |

FOREIGN PATENT DOCUMENTS

| | | |
|---|---|---|
| WO | WO 02/11310 A2 | 2/2002 |
| WO | WO 2005/034559 A1 | 4/2005 |
| WO | WO 2005/109729 A1 | 11/2005 |
| WO | WO 2006/037492 A1 | 4/2006 |
| WO | WO 2006/113712 A1 | 10/2006 |
| WO | WO 2008/039126 A1 | 4/2008 |

OTHER PUBLICATIONS

3rd Generation Partnership Project (3GPP), R1-040851, "Node B controlled scheduling," Samsung, 3GPP TSG-RAN WG1 Meeting #38, Aug. 16-20, 2004, 10 pages.
3rd Generation Partnership Project (3GPP), R1-080443, "Multi-Process Transmission Technique to Improve Uplink Coverage for LTE," Alcatel-Lucent, 3GPP TSG-RAN WG1 #51-bis, Jan. 14-18, 2008, 9 pages.
3rd Generation Partnership Project (3GPP), R1-081517, "EUL Coverage Enhancements", Ericsson, 3GPP TSG-RAN WG1 #52bis, Tdoc R1-081517, Shenzhen, China, Mar. 31, 2008, 3 pages.
3rd Generation Partnership Project (3GPP), R1-090834, "TTI Repetition for Improved Performance in Large Cells", Nokia Siemens Networks, 3GPP TSG-RAN WG1 Meeting #56, R1-090834, Athens, Greece, Feb. 9-13, 2009, 5 pages.
3rd Generation Partnership Project (3GPP), R2-072304, "Draft CR to TS 25.331 (Release-7) on Introducing 16QAM Uplink Support", Qualcomm Europe, Change Request, 25.331 CR 2982, Rev. 6, Current Version, 7.4.0, 3GPP TSG-RAN2 Meeting #58, Kobe, Japan, May 7-11, 2007, 19 pages.
3rd Generation Partnership Project (3GPP), R2-073769, "Timing Advance Corrections for 3.84/7.68 Mcps TDD EDCH", IPWireless, Change Request 25.331, CR 3088, Current version: 7.5.0, 3GPP TSG-RAN WG2 #59, Athens, Greece, Aug. 20-24, 2007, 22 pages.
3rd Generation Partnership Project (3GPP), R2-081103, "Correction to the Operation of the Timer Treset", Asustek, Change Request, 25.321, CR 0375, Current Version 7.7.0, 3GPP TSG-RAN WG2 Meeting #61, Sorrento, Italy, Feb. 11-15, 2008, 5 pages.
3rd Generation Partnership Project (3GPP), R2-081466, "Text Proposal for TTI bundling," Ericsson, 3GPP TSG-RAN WG2 #61bis, Mar. 31-Apr. 4, 2008, 8 pages.
3rd Generation Partnership Project (3GPP), R2-081779, "EUL Coverage Enhancements", Ericsson, 3GPP TSG-RAN WG2#61bis, Shenzhen, China, Mar. 31-Apr. 4, 2008, 3 pages.
3rd Generation Partnership Project (3GPP), TS 25.133 V6.21.0, "3rd Generation Partnership Project; Technical Specification Group Radio Access Network; Requirements for Support of Radio Resource Management (FDD) (Release 6)", Mar. 2008, 184 pages.
3rd Generation Partnership Project (3GPP), TS 25.133 V6.24.0, "3rd Generation Partnership Project; Technical Specification Group Radio Access Network; Requirements for Support of Radio Resource Management (FDD) (Release 6)", Mar. 2009, 184 pages.
3rd Generation Partnership Project (3GPP), TS 25.133 V7.11.0, "3rd Generation Partnership Project (3GPP); Technical Specification Group Radio Access Network; Requirements for Support of Radio Resource Management (FDD) (Release 7)", Mar. 2008, 184 pages.
3rd Generation Partnership Project (3GPP), TS 25.133 V7.14.0, "3rd Generation Partnership Project; Technical Specification Group Radio Access Network; Requirements for Support of Radio Resource Management (FDD) (Release 7)", Mar. 2009, 186 pages.
3rd Generation Partnership Project (3GPP), TS 25.133 V8.2.0, "3rd Generation Partnership Project; Technical Specification Group Radio Access Network; Requirements for Support of Radio Resource Management (FDD) (Release 8)", Mar. 2008, 184 pages.
3rd Generation Partnership Project (3GPP), TS 25.133 V8.6.0, "3rd Generation Partnership Project; Technical Specification Group Radio Access Network; Requirements for Support of Radio Resource Management (FDD) (Release 8)", Mar. 2009, 207 pages.
3rd Generation Partnership Project (3GPP), TS 25.211 V7.5.0, "3rd Generation Partnership Project; Technical Specification Group Radio Access Network; Physical Channels and Mapping of Transport Channels onto Physical Channels (FDD) (Release 7)", Mar. 2008, 54 pages.
3rd Generation Partnership Project (3GPP), TS 25.211 V7.7.0, "3rd Generation Partnership Project; Technical Specification Group Radio Access Network; Physical Channels and Mapping of Transport Channels onto Physical Channels (FDD) (Release 7)", Mar. 2009, 54 pages.
3rd Generation Partnership Project (3GPP), TS 25.211 V8.0.0, "3rd Generation Partnership Project; Technical Specification Group Radio Access Network; Physical Channels and Mapping of Transport Channels onto Physical Channels (FDD) (Release 8)", Mar. 2008, 54 pages.
3rd Generation Partnership Project (3GPP), TS 25.211 V8.4.0, "3rd Generation Partnership Project; Technical Specification Group Radio Access Network; Physical Channels and Mapping of Transport Channels onto Physical Channels (FDD) (Release 8)", Mar. 2009, 56 pages.
3rd Generation Partnership Project (3GPP), TS 25.212 V7.10.0, "3rd Generation Partnership Project; Technical Specification Group Radio Access Network; Multiplexing and Channel Coding (FDD) (Release 7)", Mar. 2009, 103 pages.
3rd Generation Partnership Project (3GPP), TS 25.212 V8.1.0, "3rd Generation Partnership Project; Technical Specification Group Radio Access Network; Multiplexing and Channel Coding (FDD) (Release 8)", Mar. 2008, 103 pages.
3rd Generation Partnership Project (3GPP), TS 25.212 V8.5.0, "3rd Generation Partnership Project; Technical Specification Group Radio Access Network; Multiplexing and Channel Coding (FDD) (Release 8)", Mar. 2009, 107 pages.
3rd Generation Partnership Project (3GPP), TS 25.213 V7.2.0, "3rd Generation Partnership Project; Technical Specification Group Radio Access Network; Spreading and modulation (FDD) (Release 7)", May 2007, 36 pages.
3rd Generation Partnership Project (3GPP), TS 25.214 V7.8.0, "3rd Generation Partnership Project; Technical Specification Group Radio Access Network; Physical Layer Procedures (FDD) (Release 7)", Mar. 2007, 85 pages.
3rd Generation Partnership Project (3GPP), TS 25.214 V7.11.0, "3rd Generation Partnership Project; Technical Specification Group Radio Access Network; Physical Layer Procedures (FDD) (Release 7)", Mar. 2009, 87 pages.
3rd Generation Partnership Project (3GPP), TS 25.214 V8.1.0, "3rd Generation Partnership Project; Technical Specification Group Radio Access Network; Physical Layer Procedures (FDD) (Release 8)", Mar. 2008, 87 pages.
3rd Generation Partnership Project (3GPP), TS 25.214 V8.5.0, "3rd Generation Partnership Project; Technical Specification Group Radio Access Network; Physical Layer Procedures (FDD) (Release 8)", Mar. 2009, 92 pages.
3rd Generation Partnership Project (3GPP), TS 25.319 V7.5.0, "3rd Generation Partnership Project; Technical Specification Group Radio Access Network; Enhanced Uplink; Overall Description; Stage 2 (Release 7)", Mar. 2008, 44 pages.
3rd Generation Partnership Project (3GPP), TS 25.319 V7.6.0, "3rd Generation Partnership Project; Technical Specification Group Radio Access Network; Enhanced Uplink; Overall Description; Stage 2 (Release 7)", May 2008, 45 pages.
3rd Generation Partnership Project (3GPP), TS 25.319 V8.1.0, "3rd Generation Partnership Project; Technical Specification Group Radio Access Network; Enhanced Uplink; Overall Description; Stage 2 (Release 8)", Mar. 2008, 52 pages.
3rd Generation Partnership Project (3GPP), TS 25.319 V8.5.0, "3rd Generation Partnership Project; Technical Specification Group Radio Access Network; Enhanced Uplink; Overall Description; Stage 2 (Release 7)", Mar. 2009, 65 pages.

(56) References Cited

OTHER PUBLICATIONS

3rd Generation Partnership Project (3GPP), TS 25.321 V7.5.0, "3rd Generation Partnership Project; Technical Specification Group Radio Access Network; Medium Access Control (MAC) Protocol Specification (Release 7)", Jun. 2007, 141 pages.

3rd Generation Partnership Project (3GPP), TS 25.321 V7.9.0, "3rd Generation Partnership Project; Technical Specification Group Radio Access Network; MAC Protocol Specification (Release 7)", Jun. 2008, 145 pages.

3rd Generation Partnership Project (3GPP), TS 25.321 V8.1.0, "3rd Generation Partnership Project; Technical Specification Group Radio Access Network; Medium Access Control (MAC) Protocol Specification (Release 8)", Mar. 2008, 157 pages.

3rd Generation Partnership Project (3GPP), TS 25.321 V8.2.0, "3rd Generation Partnership Project; Technical Specification Group Radio Access Network; MAC Protocol Specification (Release 8)", Jun. 2008, 156 pages.

3rd Generation Partnership Project (3GPP), TS 25.321 V8.5.0, "3rd Generation Partnership Project; Technical Specification Group Radio Access Network; Medium Access Control (MAC) Protocol Specification (Release 8)", Mar. 2009, 180 pages.

3rd Generation Partnership Project (3GPP), TS 25.331 V7.5.0, "3rd Generation Partnership Project; Technical Specification Group Radio Access Network; Radio Resource Control (RRC); Protocol Specification (Release 7)", Jun. 2007, 1429 pages.

3rd Generation Partnership Project (3GPP); TS 25.331 V7.6.0, 3rd Generation Partnership Project; Technical Specification Group Radio Access Network; Radio Resource Control (RRC); Protocol Specification (Release 7), Sep. 2007, 1458 pages.

3rd Generation Partnership Project (3GPP), TS 25.331 V7.9.1, "3rd Generation Partnership Project; Technical Specification Group Radio Access Network; Radio Resource Control (RRC); Protocol Specification (Release 7)", Aug. 2008, 1475 pages.

3rd Generation Partnership Project (3GPP), TS 25.331 V8.3.0, "3rd Generation Partnership Project; Technical Specification Group Radio Access Network; Radio Resource Control (RRC); Protocol Specification (Release 8)", May 2008, 1494 pages.

3rd Generation Partnership Project (3GPP), TS 25.331 V8.3.1, "3rd Generation Partnership Project; Technical Specification Group Radio Access Network; Radio Resource Control (RRC); Protocol Specification (Release 8)", Aug. 2008, 1494 pages.

\* cited by examiner

METHOD AND APPARATUS FOR ACCOMMODATING HIGHER ORDER MODULATION IN WIRELESS COMMUNICATION

CROSS REFERENCE TO RELATED APPLICATIONS

This application is a continuation of U.S. patent application Ser. No. 12/191,115, filed Aug. 13, 2008; which claims the benefit of U.S. Provisional Application No. 60/955,527, filed on Aug. 13, 2007, the contents of which are hereby incorporated by reference herein.

FIELD OF INVENTION

This application is related to wireless communications.

BACKGROUND

Higher-order modulation for the uplink (UL) has been introduced for some wireless communication networks. One example is Release 7 of the High Speed Packet Access (HSPA) specifications. In these specifications, for example, a user equipment (UE) may operate (or not) in the 16-symbol quadrature amplitude modulation (16QAM) mode. When the UE operates in the 16QAM mode, it has to utilize one of several newly defined enhanced dedicated channel (E-DCH) transport block tables appropriate for transmitting at data rates up to the maximum rates allowed by 16QAM operation. When the UE does not operate in the 16QAM mode, it has to utilize one of the original E-DCH transport block tables.

In practical deployments, not all cells of a radio network are necessarily upgraded at the same time to support a new feature such as 16QAM operation. Therefore, it is likely that in initial deployment, some cells in the network will support the feature and other will not. As the UE moves within the network, it will have to add cells to and remove cells from its active set that may or may not support 16QAM operation. A cell that supports 16QAM operation can properly receive signals from a UE not operating in 16QAM mode. However, a cell not supporting 16QAM operation can not properly receive signals from a UE operating in 16QAM mode. For this reason, a modification to the active set update procedure has been introduced whereby the network can signal to the UE whether it should start or stop 16QAM operation. The network would typically signal to the UE to stop 16QAM operation when a cell not supporting 16QAM operation is added to the active set, and may signal to the UE to start 16QAM operation when all cells in its active set support it.

Although this modification allows the network to signal the start or stop of 16QAM operation to the UE, the UE still does not have all the information it needs to properly switch between the two modes of operation. When switching operation, the UE cannot use some E-DCH configuration parameters as they are currently defined.

Additionally, when these parameters are changed, the enhanced media access control (MAC-e) needs to flush the UL hybrid automatic repeat request (HARQ) buffers which contain MAC-e PDUs with the old enhanced transport format combination index (E-TFCI) tables.

However, the current active set update procedure does not have any provisions to change the above mentioned E-DCH configuration parameters. Some of the parameters, such as E-DPCCH/DPCCH power offset and Reference E-TFCI, may be changed with the active set update but only when a serving E-DCH cell change occurs. However, starting and stopping of 16QAM operations may also occur when adding a new cell to the E-DCH active set without changing the serving cell.

The absence of this signaling in the active set update procedure prevents proper transitioning between 16QAM mode and non-16QAM (normal) mode when a cell is added or removed from the (E-DCH) active set or when the E-DCH serving cell is modified. By providing the mechanisms for proper transition between 16QAM mode and non-16QAM mode resulting from an active set update procedure, the embodiments to be described herein allow a reduction in re-configuration delays and a reduction of signaling overhead (power and bandwidth).

SUMMARY

A method and apparatus are disclosed for reconfiguring a wireless transmit/receive unit (WTRU). The method comprises receiving an active set update message indicating that a mode of operation allowing a certain modulation scheme is enabled or disabled; and performing at least one of: performing a MAC reset procedure, updating a set of reference enhanced transport format combination indicators (E-TFCIs) and associated power offsets, determining actions related to E-DPCCH boosting, modifying information related to an enhanced dedicated channel (E-DCH), and modifying an index that indicates an E-DCH transport block size table. The update message includes at least one modified information element (IE).

BRIEF DESCRIPTION OF THE DRAWINGS

A more detailed understanding may be had from the following description, given by way of example in conjunction with the accompanying drawings wherein.

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

A method and wireless transmit/receive unit (WTRU) are disclosed that enable re-configuring E-DCH transmission parameters when 16QAM operations are started or stopped following an active set update procedure.

Figure 1:
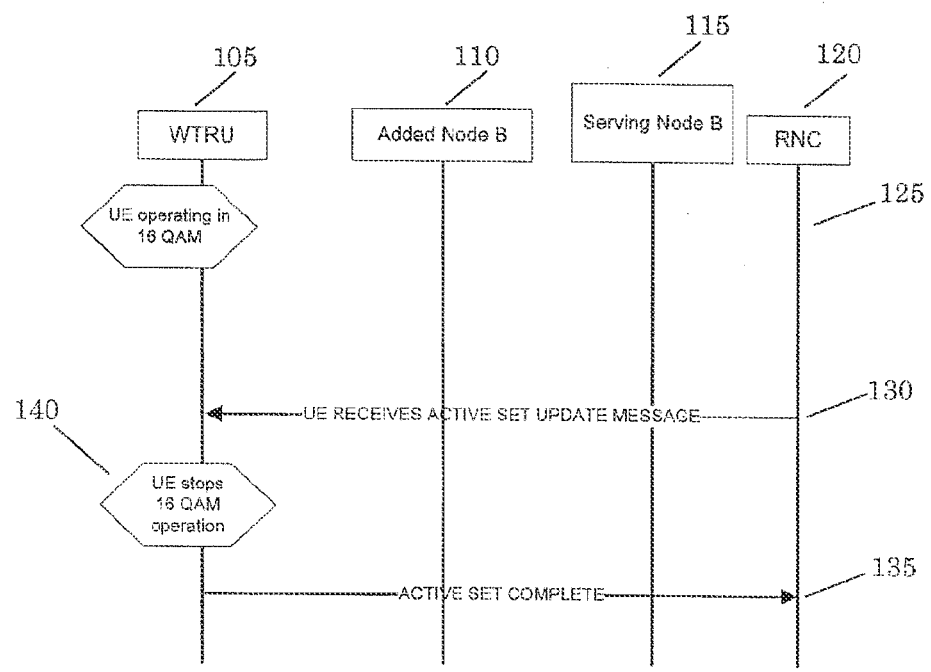
FIG. 1 shows a signaling diagram for an active set update message for higher order modulation.

FIG. 1 is an example of a signaling diagram which summarizes events occurring as a WTRU moves between cells which employ different modulation modes for communication. As a specific example, FIG. 1 shows a case where a WTRU moves from a cell in which 16QAM modulation is available toward a cell where this modulation scheme is not available. In FIG. 1, time progresses from top to bottom. Four vertical lines indicate status of four entities: the WTRU 105, a Node B 110 not providing 16 QAM, a Node B 115 providing 16QAM, and a radio network controller (RNC) 120 interacting with both Node Bs 110 and 115. Horizontal arrows show interactions between these entities.

At time 125 the WTRU is operating using 16QAM in communication with Node B 115. At time 130 the RNC senses that the WTRU is approaching the cell of Node B 110 which does not provide 16QAM. The RNC transmits an active set update message to the WTRU at time 130 for the purpose of updating an active set in the WTRU. The active set determines with which cells the WTRU can properly communicate. The WTRU receives the message and responds to it at time 140 by reconfiguring itself so that it can communicate with Node B 110 without using 16QAM since, Node B 110 does not support this particular modulation scheme. At time 135 the updating of the active set and reconfiguring of the WTRU is complete.

Figure 3A:
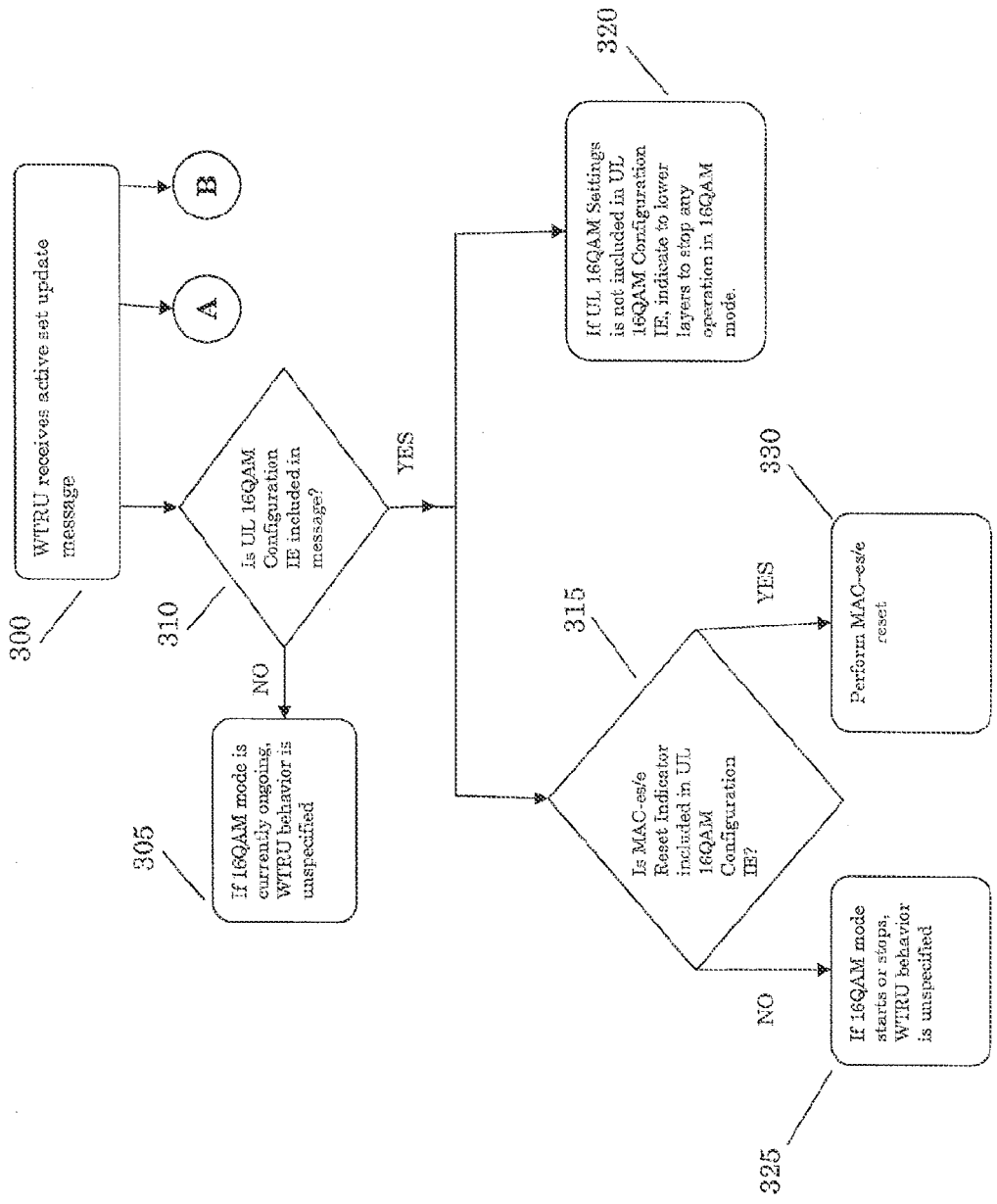
FIGS. 3A and 3B are a flowchart of an embodiment of a method for reconfiguring a WTRU in response to an update message.
Figure 3B:
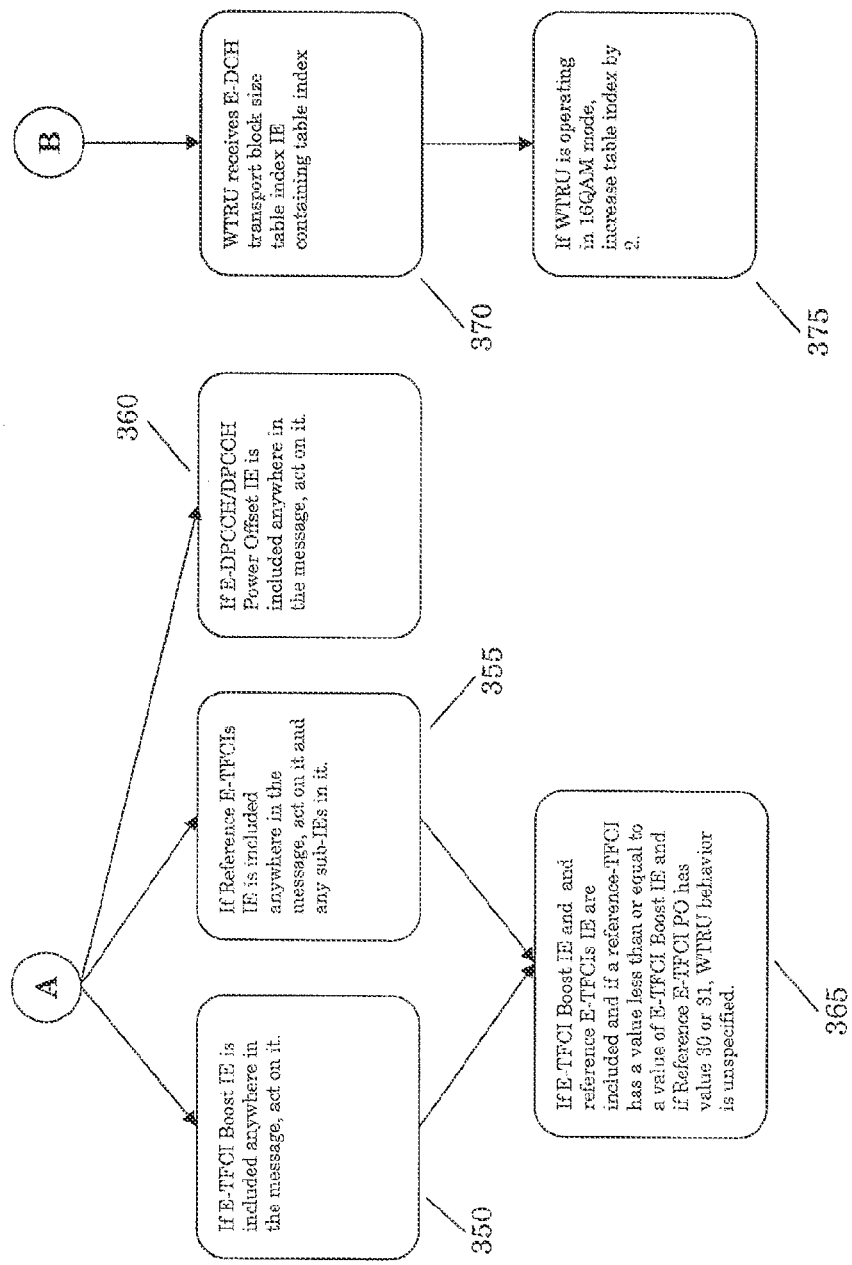

FIGS. 3A and 3B show an embodiment of a method for reconfiguring a WTRU in response to receiving an update message. The update message may contain newly defined information elements (IEs) for controlling update procedures. The WTRU acts on these IEs if certain conditions are met.

The active set update message is received at 300. The update procedure may include resetting a media access control (MAC), updating a set of reference enhanced transport format combination indicators (E-TFCIs) and associated power offsets, modifying information related to a dedicated channel (DCH), and modifying an index that indicates a transport block size table. Each of these will now be described in detail. The WTRU is assumed to be communicating within a wireless network.

First to be described is the procedure of resetting a MAC. In order to clear the buffers and start using the new E-DCH configuration, a MAC-es/e reset may be performed during the active set update procedure when a change of available modulation occurs, such as from 16QAM being available to not being available or vice-versa. This may be described as a change from 16QAM mode to non-16QAM mode or vice-versa. The network signals the WTRU through an information element (IE) included in the active set update message. The IE is included if MAC-es/e reset is to be performed. The WTRU may receive the message with this IE at 300. This particular IE may be included in the active set update message itself. It may be included in the root of the message or within an already included IE, such as an E-DCH reconfiguration info IE, or somewhere within the branching ("arborescence") of included IEs, or in a newly introduced group of IEs that are present when the WTRU supports, for example, 16 QAM. The latter case is shown in FIG. 3A, and an example of a newly introduced IE designated UL 16QAM Configuration is shown in 310. Details of the UL 16QAM Configuration IE and its included sub-IEs are presented in Table 4 below.

Referring to FIG. 3A, the WTRU checks the active set update message, received at 300, for the presence of the UL 16QAM Configuration IE, 310. If the UL 16QAM Configuration IE is not included in the message at 310 and if the WTRU is operating in 16QAM modulation mode, the WTRU behavior is unspecified, 305.

If the UL 16QAM Configuration IE is present, the WTRU checks if this IE includes a MAC-es/e reset indicator, 315. If this reset indicator is present the WTRU performs a reset of MAC-es/e entity, 330. The reset may be performed according to the standard 3GPP TS 25.321, version 7.5.0 or later. If the reset indicator is not present and the WTRU starts or stops 16QAM mode operation, the WTRU behavior is unspecified, 325.

If the UL 16QAM Configuration IE is found to be included in 310 but this IE does not include an IE called UL 16QAM Settings, an indication may be sent to lower layers in the WTRU to stop any operation in 16QAM mode, 320.

Alternatively, the WTRU may perform a MAC-es/e reset if the UL 16QAM Configuration IE is present, and may not perform a MAC-es/e reset if this IE is not present.

Alternatively, the WTRU may perform MAC-es/e reset if 16QAM mode operation is started or stopped.

Next to be described is updating a set of reference enhanced transport format combination indicators (E-TFCIs) and associated power offsets. In general, a TFCI allows receiving layers to identify a currently valid Transport Format Combination and hence enables a receiver to decode, de-multiplex and deliver received data. The WTRU may update reference E-TFCIs and associated power offsets even if the E-DCH serving cell is not changed by the active set update procedure. When 16 QAM mode is started or stopped, the reference E-TFCI and associated power offsets are updated accordingly.

Again, new IEs may be defined for this purpose. These IEs, referred to in the following description, are described in Tables 1-4 below. Referring to FIG. 3B and Tables 1-4, if the E-TFCI Boost IE is included anywhere in the active set update message at 300, this IE is acted upon, 350. If the E-DPCCH/DPCCH Power Offset IE is included anywhere in the active set update message at 300, this IE is acted upon, 360. If the Reference E-TFCIs IE is included anywhere in the active set update message at 300, this IE is acted upon, and any sub-IEs in it are acted upon 355. If the E-TFCI Boost IE and Reference E-TFCIs IE are both included in the update message (350 and 355), and if a reference E-TFCI has a value less than or equal to a value of the E-TFCI Boost IE, and if the Reference E-TFCI PO has a value equal to one or more predetermined values, then the behavior of the WTRU is left unspecified 365. In the particular example of Tables 2 and 3, the predetermined values used for both reference E-TFCI PO IEs are 30 and 31.

Note that this Reference E-TFCI PO IE is distinct from an existing IE of the same name within the E-DCH reconfiguration information IE (Table 2). The two Reference E-TFCI PO IEs may contain the same information but should never be present simultaneously.

Again, the IEs may be present in the active set update message itself. Alternatively, they may be included in the root of the message or in one of the included IEs, or somewhere within the branching of included IEs. The WTRU starts using the new IEs at the activation time. If the new IE is not included the WTRU may keep using an existing reference E-TFCI and power offsets with the indices now pointing to the new E-DCH Transport Block Size table. Alternatively, if the new IE is not included, the WTRU behavior is unspecified. Other parameters that are not listed above may need to be modified when 16QAM operations are started or stopped. This may be achieved by the same or similar method as that described above.

Next to be described is modifying an index that indicates a transport block size. In current specifications, there are two sets of E-DCH Transport Block Size tables specified for 2 ms transport time interval (TTI): two tables (2 ms TTI E-DCH Transport Block Size Table 0 and 1) for QPSK operations and two tables for 16QAM operations (2 ms TTI E-DCH Transport Block Size Table 2 and 3). Referring to FIG. 3B, the WTRU receives the table index 0 or 1 in the E-DCH Transport Block Size table index IE 370 which, in turn, is contained in the active set update message, 300. If the WTRU is operating in 16QAM mode the WTRU automatically adds 2 to the table index, thereby indicating that the 16QAM tables are to be used, 375. In this case, indices in the Scheduling Grant (SG) table may refer to Scheduling Grant Table 2 in the standard 3GPP TS 25.321, version 7.5.0 or later.

It may be desirable to change the E-DCH Transport Block Size table index during an active set update procedure resulting in a change of 16QAM operations, an operation that is not possible in current specifications.

Various alternatives may be implemented, each alternative affecting where the above procedures get executed in the active set update procedure—that is, where in the active set update message the IEs are located relative to existing IEs.

In a first alternative, IEs may be added as part of the E-DCH reconfiguration information IE. Specifically, IEs for the MAC es/e reset indicator and E-TFCI boost may be added to the E-DCH RL Info new serving cell sub IE, and IEs for E-DPCCH/DPCCH power offset and Reference E-TFCIs and its related sub IEs may be added to the E-DCH RL Info other cells IE.

In a second alternative, the added IEs above are added as part of the E-DCH reconfiguration information IE. The difference in this alternative is that the IEs MAC es/e reset indicator, E-TFCI boost, and E-TFCI BetaED Switch above are added to the root of the E-DCH reconfiguration information, while the other IEs for E-DPCCH/DPCCH power offset and Reference E-TFCIs and its related sub IEs are added under the E-DCH RL Info other cells sub IE.

In a third alternative, an E-DCH Info IE is added to the active set update message, optionally adding conditions to ensure no ambiguity results from having the same IE repeated at different places within the active set update message branching.

In a fourth alternative, a new IE is created that contains all other new IEs and is added to the active set update message. This IE may always be present, or it may be present only if 16QAM is supported by the UE, or only present if the 16QAM operation is stopped or started.

Figure 2:
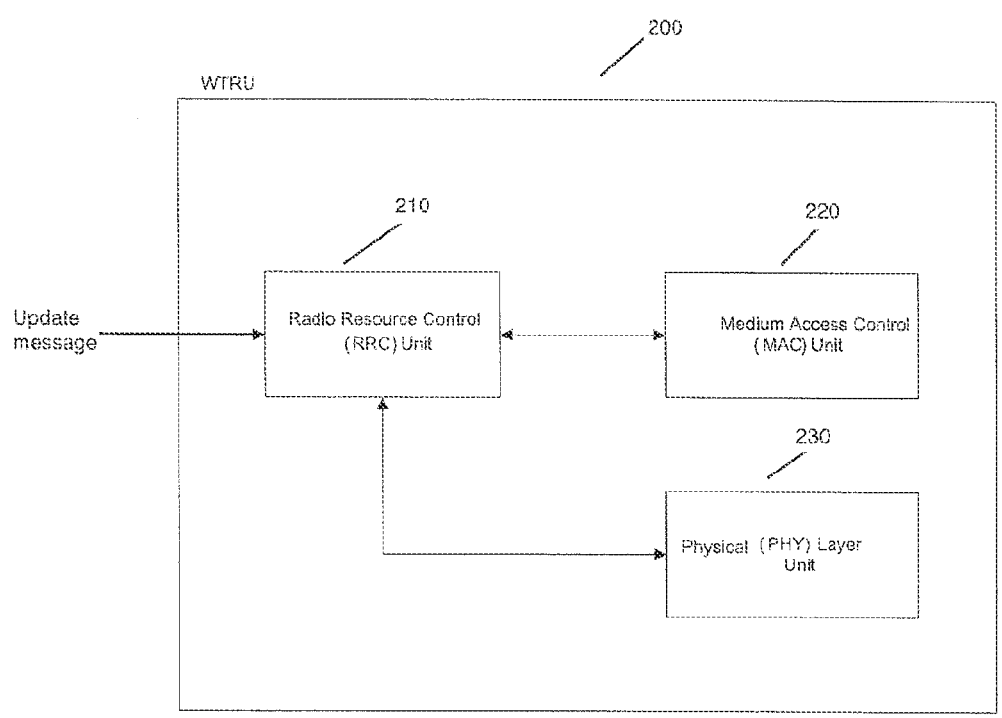
FIG. 2 is a block diagram of an embodiment of a wireless transmit/receive unit (WTRU).

FIG. 2 shows an embodiment of a WTRU 200 configured for implementing the methods described above. WTRU 200 includes a radio resource control (RRC) unit 210 in communication with a Media Access Control (MAC) unit 220 and with a physical layer (PHY) unit 230. Physical layer unit 230 may embody the Layer 1 (L1) known in certain models of wireless communications.

RRC unit 210 receives an update message. The message may come from a radio network controller (RNC, not shown in FIG. 2) such as feature 120 in FIG. 1. RRC unit 210 processes the message and responds by interacting with MAC unit 220 and PHY unit 230 to reconfigure WTRU 200 in response to the message, according to the method described above.

Tables 1-4 show details of new and modified IEs according to the above descriptions.

TABLE 1

Active Set Update

| Information Element/ Group name | Need | Multi | Type and reference | Semantics description | Version |
|---|---|---|---|---|---|
| ... | ... | ... | ... | ... | ... |
| UL 16QAM configuration | OP | | UL 16QAM configuration 10.3.6.69c | | REL-7 |
| E-DCH reconfiguration information same serving cell | OP | | E-DCH reconfiguration information same serving cell 10.3.6.69b | This IE is not present if the serving E-DCH cell is changed with this message. | REL-7 |
| E-TFCI boost | OP | | Integer (0 ... 127) | E-TFCI threshold beyond which boosting of E-DPCCH is enabled | REL-7 |
| E-TFCI BetaED Switch | OP | | Enumerated (etfci-0, etfci-128) | E-TFCI threshold used for the computation of the gain factor $\beta_{ed}$ according to 3GPP TS 25.214 | REL-7 |
| ... | | ... | ... | ... | ... |

TABLE 2

E-DCH reconfiguration information

| Information Element/ Group name | Need | Multi | Type and reference | Semantics description | Version |
|---|---|---|---|---|---|
| ... | ... | ... | ... | ... | ... |
| >>Reference E-TFCI PO | MP | | Integer (0 ... 29) | Refer to quantization of the power offset in 3GPP TS 25.213 | REL-6 |
| | | | (30, 31) | Values 30 and 31 are only used for E-TFCI > ETFCI Boost | REL-7 |
| ... | ... | ... | ... | ... | ... |

TABLE 3

E-DCH reconfiguration information same serving cell

| Information Element/ Group name | Need | Multi | Type and reference | Semantics description | Version |
|---|---|---|---|---|---|
| E-DPCCH/DPCCH power offset | OP | | Integer (0 ... 8) | This IE is not present if the serving E-DCH cell is changed with this message. Refer to quantization of the power offset in 3GPP TS 25.213 | REL-7 |
| Reference E-TFCIs | OP | 1 to 8 | | This IE is not present if the serving E-DCH cell is changed with this message. See 3GPP TS 25.214. | REL-7 |
| >Reference E-TFCI | MP | | Integer (0 ... 127) | | REL-7 |
| >Reference E-TFCI PO | MP | | Integer (0 ... 29) | Refer to quantization of the power offset in 3GPP TS 25.213 | REL-7 |
| | | | (30, 31) | Values 30 and 31 are only used for E-TFCI > ETFCI Boost | REL-7 |

TABLE 4

UL 16QAM configuration

| Information Element/ Group name | Need | Multi | Type and reference | Semantics description | Version |
|---|---|---|---|---|---|
| UL 16QAM settings | OP | | UL 16QAM settings 10.3.6.86a | Presence of this IE indicates that the UE should operate in 16QAM mode; absence indicates that the UE is not to operate in 16QAM mode. | REL-7 |
| MAC-es/e reset indicator | OP | | Enumerated (true) | TRUE Indicates the MAC-es/e entity needs to be reset. | REL-7 |
| E-TFCI table index | OP | | Integer (0 ... 1) | Indicates which standardised E-TFCI TB size table shall be used. See Note 1. | REL-7 |

NOTE 1:
If the UE is operating in 16QAM mode, the value of "E-TFCI table index" is increased by 2, and indices in the SG-Table refer to Scheduling Grant Table 2 in [15].

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method for reconfiguring a wireless transmit/receive unit (WTRU) via an active set update message, the method comprising:
    sending the active set update message comprising a modulation mode information element (IE), the modulation mode IE indicating to the WTRU whether to operate in a modulation mode; and
    performing at least one of:
        determining whether to include a media access control (MAC) reset IE in the modulation mode IE, wherein an inclusion of the MAC reset IE indicates to the WTRU to reset a MAC entity; or determining whether to include an enhanced dedicated channel (E-DCH) transport format combinations indicator (E-TFCI) table index IE in the modulation mode IE, wherein an inclusion of the E-TFCI table index IE indicates to the WTRU which E-TFCI transport block size table to use.

2. The method of claim 1, wherein the modulation mode is 16-symbol quadrature amplitude modulation (16QAM).

3. The method of claim 1, wherein the active set update message comprises information enabling the WTRU to update an active set which indicates active cells available to the WTRU for communication.

4. The method of claim 1, wherein the active set update message further indicates to the WTRU whether to modify a power offset of an enhanced dedicated physical control channel (E-DPCCH).

5. The method of claim 1, wherein the active set update message further indicates to the WTRU whether to modify an E-TFCI threshold.

6. The method of claim 5, wherein boosting of enhanced dedicated physical control channel (E-DPCCH) is enabled when an E-TFCI value exceeds the E-TFCI threshold.

7. A network entity comprising:
a processor configured to:
send an active set update message that includes a modulation mode information element (IE), the modulation mode IE indicating to a WTRU whether to operate in a modulation mode; and
perform at least one of:
determine whether to include a media access control (MAC) reset IE in the modulation mode IE, wherein an inclusion of the MAC reset IE indicates to the WTRU to reset a MAC entity; or
determine whether to include an enhanced dedicated channel (E-DCH) transport format combinations indicator E-TFCI table index IE in the modulation mode IE, wherein an inclusion of the E-TFCI table index IE indicates to the WTRU which E-TFCI transport block size table to use.

8. The network entity of claim 7, wherein the modulation mode is 16-symbol quadrature amplitude modulation (16QAM).

9. The network entity of claim 7, wherein the active set update message comprises information enabling the WTRU to update an active set which indicates active cells available to the WTRU for communication.

10. The network entity of claim 7, wherein the active set update message further indicates to the WTRU whether to modify a power offset of an enhanced dedicated physical control channel (E-DPCCH).

11. The network entity of claim 7, wherein the active set update message further indicates to the WTRU whether to modify an E-TFCI threshold.

12. The network entity of claim 11, wherein boosting of an enhanced dedicated physical control channel (E-DPCCH) is enabled when an E-TFCI value exceeds the E-TFCI threshold.

13. A method for a wireless transmit/receive unit (WTRU) to act upon receiving an active set update message, the method comprising:
receiving the active set update message indicating whether to operate in a modulation mode via a modulation mode information element (IE); and
in response to the active set update message, indicating to one or more lower layers to operate in or stop the modulation mode, and performing at least one of:
determining whether to perform a media access control (MAC) reset procedure based on whether a MAC reset IE is included in the modulation mode IE, or
determining an enhanced dedicated channel (E-DCH) transport format combinations indicator (E-TFCI) transport block size table based on whether an E-TFCI table index IE is included in the modulation mode IE.

14. The method of claim 13, further comprising: when the MAC reset IE is included in the modulation mode IE, performing a MAC reset.

15. The method of claim 13, wherein the determining comprises:
identifying the E-TFCI transport block size table based on a value of the E-TFCI table index IE increased by 2 when the WTRU is operating in a 16-symbol quadrature amplitude modulation (16QAM) mode.

16. The method of claim 13, wherein an inclusion of the modulation mode IE indicates to the WTRU to operate in the modulation mode, and an absence of the modulation mode IE indicates to the WTRU not to operate in the modulation mode.

17. The method of claim 13, wherein the modulation mode is 16-symbol quadrature amplitude modulation (16QAM).

18. The method of claim 13, wherein the active set update message comprises information enabling the WTRU to update an active set which indicates active cells available to the WTRU for communication.

19. The method of claim 13, wherein determining the index that indicates an E-TFCI transport block size table comprises:
using an E-TFCI transport block size table indicated by the E-TFCI table index IE when the E-TFCI table index IE is included; and
using an E-TFCI transport block size table indicated by a previous index when the E-TFCI table index IE is not included.

20. A wireless transmit/receive unit (WTRU) comprising:
a processor configured to:
receive an active set update message indicating whether to operate in a modulation mode via a modulation mode information element (IE); and
indicate to lower layers to operate in or stop the modulation mode, and perform at least one of:
determine whether to perform a media access control (MAC) reset procedure based on whether a MAC reset IE is included in the modulation mode IE, or
determine an enhanced dedicated channel (E-DCH) transport format combinations indicator (E-TFCI) transport block size table based on whether an E-TFCI table index IE is included in the modulation mode IE.

21. The WTRU of claim 20, wherein the processor is further configured to perform a MAC reset procedure when the MAC reset IE is included.

22. The WTRU of claim 20, wherein the processor is further configured to use an E-TFCI transport block size table indicated by the E-TFCI table index IE when the E-TFCI table index IE is included, and use an E-DCH transport block size table indicated by a previous index when the E-TFCI table index IE is not included.

23. The WTRU of claim 20, wherein the processor is configured to operate in the modulation mode when the modulation mode IE is included in the active set update message, and stop operating in the modulation mode when the modulation mode IE is not included in the active set update message.

24. The WTRU of claim 20, wherein the modulation mode is 16-symbol quadrature amplitude modulation (16QAM).

* * * * *